United States Patent Office 3,391,764
Patented July 9, 1968

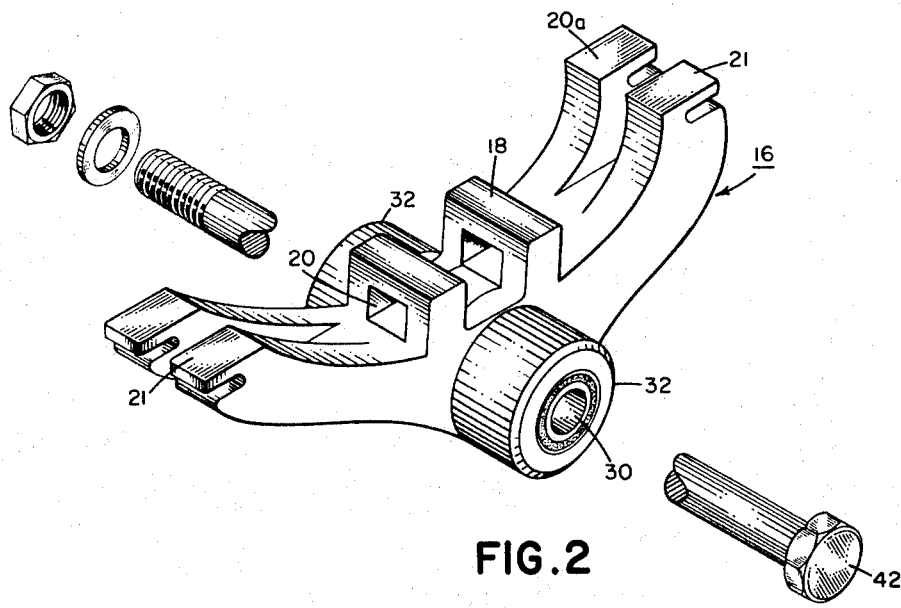
FIG.2
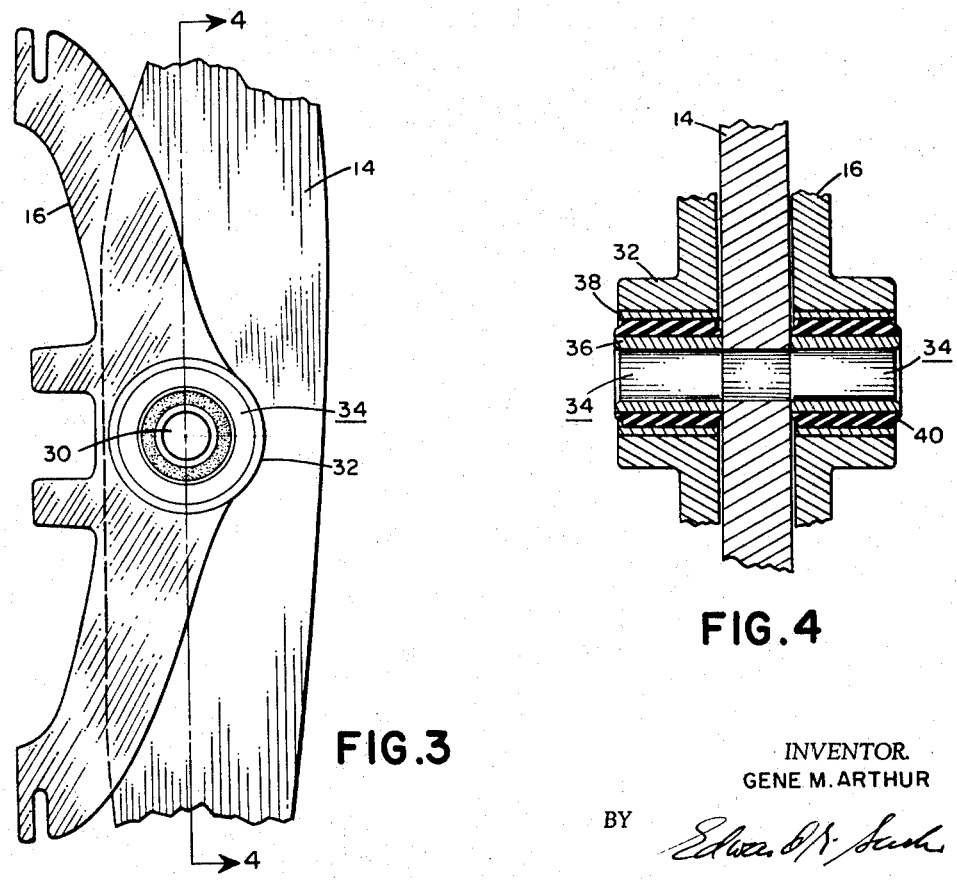
FIG.3
FIG.4
INVENTOR.
GENE M. ARTHUR
BY
ATTORNEY

3,391,764
BRAKE ASSEMBLY SUSPENSION SYSTEM FOR RAILWAY CAR WHEELS
Gene M. Arthur, Norwalk, Ohio, assignor to Clevite Corporation, a corporation of Ohio
Filed Mar. 17, 1966, Ser. No. 535,189
24 Claims. (Cl. 188—221.1)

ABSTRACT OF THE DISCLOSURE

A brake assembly for a railway wheel in which a bushing is utilized to resiliently suspend the brake head from the brake lever to maintain proper orientation of the brake shoe relative to the said wheel.

---

This invention relates generally to a brake assembly for railway cars and more particularly to a suspension system for securing the brake head to the truck brake lever and to suitably orient the brake shoe.

In the prior art it has been customary to secure the brake head to the truck brake lever by means of a connecting joint usually consisting of a steel bushing disposed in the brake head and a steel pin which protrudes through the bushing and the lever to connect the two members. Relative movement occurs between the pin (or some other like device) and the bushing and, consequently, it has been found necessary to provide the bushing with a reasonably fine surface finish and to lubricate the surfaces from time to time. Experience has shown that despite many attempts to protect the bushing from the outside environment, various particles sooner or later will penetrate into the bushing and cause abrasive action between the sliding surfaces. The particles causing most serious damage are usually sand, grit, or a combination of slime with ice or snow. The wear of these bushings is so serious that replacement thereof is usually necessary within a period of two years. In order to obviate these difficulties various seals have been proposed. Due to the tolerances involved, however, the seals are not able to prevent the penetration of dirt and particles, and in any event increase the cost of manufacture and maintenance.

Secondly, it has been necessary to devise various mechanisms to maintain the brake shoe in proper orientation with respect to the railway car wheel. The brake shoe must be maintained at all times in proper cooperating relationship with the surface of the wheel. Any misalignment will cause undue wear upon the affected parts of the brake shoe and ultimately will make the brake shoe useless. This problem is usually solved by providing suitable linkage members which are attached to the lever. In recent years it has also been the practice to provide the brake head with a certain degree of axial freedom. Such a device is shown in U.S. Patent No. 3,205,980, the main object being to exert the brake shoe upon the railway wheel with a slight force to generate sufficient heat to melt away snow or ice that may have accumulated between the brake shoe and the wheel. The above noted patent discloses a system whereby the brake head is pressed against the wheel by means of a compression spring.

The present invention completely eliminates the sliding surface suspension system, as well as the brake shoe orientation linkage system.

The invention is based upon the recognition that a certain type of rubber bushing can be utilized in this environment without being detrimentally affected by ambient conditions or abrasive materials that will normally filter into the bushings and between the sliding surfaces thereof. In the case of metal bushing, the abrasive action is such that the sliding surfaces are continuously ground away until the tolerance between the surfaces makes a replacement of the bushing necessary. On the other hand, sliding surface rubber bushings cannot withstand the abrasive effect for any lengthy period of time and, consequently, such bushings are not suitable for this type of application.

The bushing herein under consideration, although per se not novel, is of a type in which no relative sliding motion takes place between a telescoped inner and outer member. The bushings are arranged between members of the brake assembly in a unique manner which facilitates the operativeness of the invention. Each bushing, generally speaking, comprises an inner and an outer tubular member, of rigid material such as plastic or metal, with a rubber annulus interposed therebetween. In the preferred embodiment the annulus is constructed and inserted into the tubular member in a manner so as to be under radial compression and axial elongation to prevent sliding movement between the bearing surfaces. In the present invention the tubular member is press fitted into an opening of the lever while the other member is secured to the brake head. Any relative rotation between the lever and the brake head can take place only against the torque resistance established by the rubber annulus.

Inasmuch as the invention has no sliding surfaces, the abrasive grinding effect previously encountered has been completely eliminated. Due to the resilient nature of the rubberlike bushing, the brake shoe can be oriented at all times in suitable relationship to the wheel and, if necessary, resiliently biased against the railway wheel.

It is therefore the primary object of this invention to provide a brake assembly which avoids the shortcomings of the prior art.

It is a further and more particular object of this invention to provide a brake assembly in which the need for seals and other safety devices for protecting the bushing member lever are eliminated.

It is a still further object of this invention to improve the work-life of the brake assembly by eliminating the sliding surfaces which have been referred to above.

It is another object of this invention to provide a brake assembly obviating the need for closely held diametrical tolerances in the various connecting linkages to and between the lever and the brake head.

It is a still further object of this invention to provide a brake assembly in which the joint pivotably connects the lever and the brake head need not be lubricated or periodically cleaned.

It is a still further object of this invention to provide a brake assembly in which the brake head together with the brake shoe are resiliently supported and the brake shoe is maintained, at all times, in proper orientation relative to the railway wheel.

An aspect of the present invention is the provision of the brake assembly for a railway wheel which includes a lever member and a brake head. The brake head has been modified to receive a connecting device which includes a rubberlike bushing. The connecting device, or parts thereof, extend through aligned openings in the lever and the brake head for resiliently connecting these two parts The brake shoe is detachably, but substantially rigidly, carried by the brake head. The orientation of the brake shoe relative to the railway wheel is determined by the torque and, selectively, compressional capability of the rubber bushing.

For a better understanding of the present invention, together with other and further objects thereof, reference is had to the following description taken in connection with the accompanying drawings, and its scope will be pointed out in the appended claims.

In the drawings:
FIGURE 1 is a partly exploded, perspective view of part of a brake assembly, and a railway wheel;

FIGURE 2 is a perspective view of a brake head and connecting bolt;

FIGURE 3 is an elevational side view of the truck brake lever and brake head in assembled position;

FIGURE 4 is a cross sectional view taken along line 4—4 of FIGURE 3;

Figure 1:
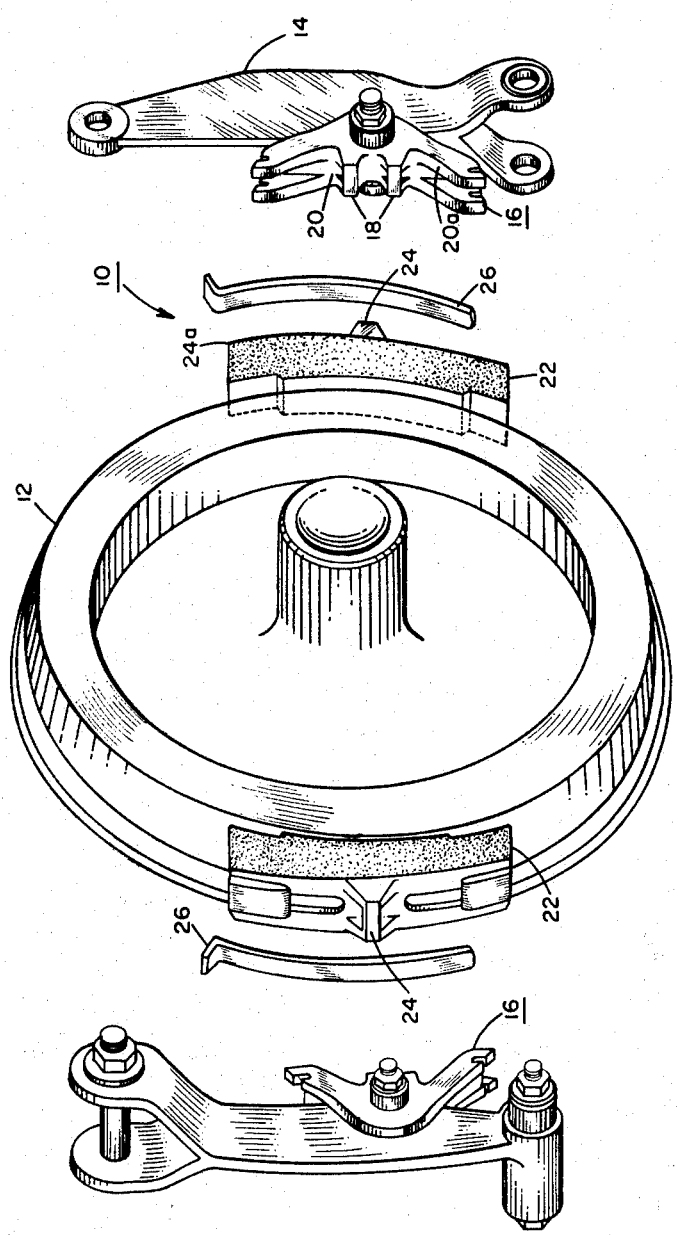

Referring now to FIGURES 1 to 3 of the drawings, there is shown part of a brake assembly 10 which is adapted to be employed for braking the rotary movement of a railway wheel 12. The brake assembly includes such conventional members as a truck or brake lever 14 suitably fastened to the railway truck, not shown, and adapted to receive a brake head 16 in a manner which is the subject of this invention and hereinafter further described. The brake head 16 is provided on its forward face intermediate of the top and bottom with two vertically slotted lugs 18. These lugs extend axially and are spaced vertically.

A brake shoe 22, constructed of suitable frictional material, is provided with a lug 24 on its rear face and formed with a vertical slot therethrough intended to register with slot 20 in the head lugs 18 in order to receive a shoe locking key 26 for rigidly securing the brake shoe onto the brake head. The key 26 can be readily removed at any time for servicing the brake shoe. The contour of the brake shoe is such that the rear face 24a abuts the shoe engaging toes 21 on the forward face 20a of the brake head. The brake shoe does not move independent of the brake head and the orientation of the brake shoe with respect to the wheel is determined by the movement of the brake head, respectively the truck brake lever.

Referring now specifically to FIGURES 2 to 4, the brake head 16 is illustrated, in the preferred embodiment, as having spaced side walls for receiving therebetween the truck brake lever 14. The side walls as well as the truck brake lever are provided with axially aligned openings 30. The brake head 16 is provided with axial extensions 32 in tubular form near the central axis to a structure for receiving in each opening 30 a connecting device which includes a rubberlike bushing 34.

The bushing 34 is composed of an inner and an outer rigid tubular member or sleeve 36 and 38, respectively, and separated by an annulus 40 of rubberlike material which is maintained between the two rigid members under substantial radial compression and axial elongation. The inwardly facing axial end of each inner tubular member 36 abuts the truck brake lever and a stud or bolt 42 compresses the two inner tubular members 36 in the direction towards each other and against the lever to prevent any relative movement between the tubular members 36 and the lever. The outer tubular member 38 of each bushing 34, is received within the opening 30 of the brake head with an interference fit and does not bear against the truck brake lever 14. Consequently the brake head is free to rotate slightly against the torque resistance of the bushing member. Relative motion can be established between the head 16 together with the inner tubular member 36 and the lever 14 together with the outer tubular member 38 and the permissible extent of relative rotary motion depends solely upon the torque and compressional capabilities of the rubberlike annulus 40. In order to achieve the objective of this invention, it is of course essential that the rubber annulus does not slide relative to either one of the two tubular members. In the preferred embodiment, the outside diameter of the annulus 40 is greater than the inside diameter of the outer tubular member 38 to establish radial compression and axial elongation as referred to above. In accordance with known fabricating procedures, the inner or the outer surface of the annulus may be additionally, or alternatively, vulcanized in situ to the inner and/or outer tubular member. An adhesive film may be sprayed or brushed upon the inner and/or outer surface of the respective tubular member. After either a forced or smooth insertion of the annulus into the outer tubular member, or upon receiving the inner tubular member, heat is applied upon the tubular member coated with the adhesive material to soften the same and to glue the two parts together. While the "cementing" is not essential to operating the invention, it does increase the resistance to slippage between the annulus and the rigid member in the above described fabricating methods.

Figure 5:
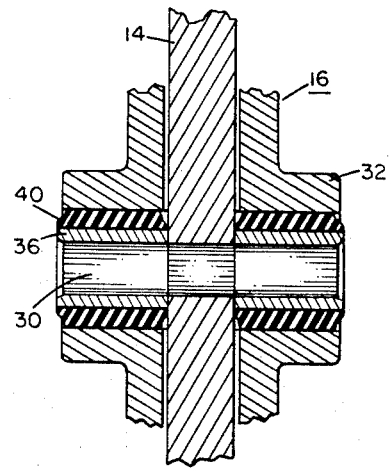
FIGURES 5 and 6 are views similar to FIGURE 4 showing a modification of the invention.

FIGURE 5 shows a further modification of the invention. Herein the outer tubular member 38 has been eliminated as a separate embodiment and the brake head itself serves as the receptacle for the annulus. The advantages that arise from the elimination of the outer tubular member 38 are two-fold. In the first instance, there is an obvious saving of labor and material. Additionally, this approach makes it possible to insert the annulus 40 into the brake head without requiring a well prepared surface finish of the internal wall which defines the opening 30. The suspension system is assembled by first placing upon the inner tubular member 36 the annulus 40 and thereafter inserting elements into the opening of the brake head.

Figure 6:
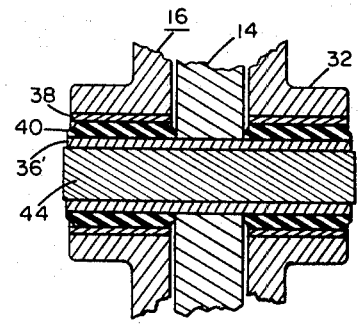

FIGURE 6 illustrates another modification of the invention. In this embodiment the inner tubular member 36 is also utilized to function, additionally, in similar capacity as connecting stud 42 as described in connection with and shown in FIGURE 2. In order to assemble the device, the inner sleeve or support 36' is inserted into and through the opening of the truck lever 14 with a tight interference fit. The annulus 40 and outer tubular member 38 are then superimposed upon the support 36' in the conventional manner. The support 36' may be either hollow or filled with an additional supporting stud 44.

Figure 7:
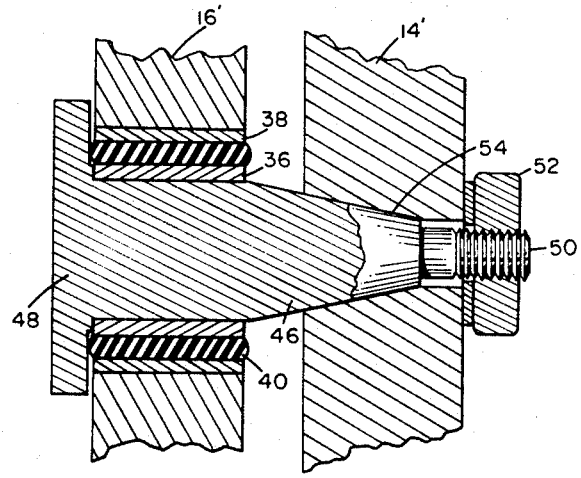
FIGURE 7 illustrates a further modification of the truck brake lever and brake head suspension system in accordance with this invention.

FIGURE 7 shows a still further modification of the invention in which only one rubberlike bushing is utilized to connect the brake head 16' to the truck brake lever 14'. While the above described brake head 16 is provided with axial extensions on both sides, and receives the truck brake lever therebetween, the instant embodiment is relatively flat and a single bushing is received within the central opening and the axial ends thereof are substantially flush with the outer surfaces of the brake head. The truck brake lever 14' is located in substantially co-extending relationship and the two members are connected by means of a stud 46 provided at one end with a radially enlarged head 48 bearing against the inner tubular member 36 of the bushing 34. The opposite end of the stud 46 is tapered toward the truck lever 14' and the tapered portion fits snugly into a correspondingly tapered opening of the truck brake lever. The stud terminates at the end opposite from the head 48 with a threaded portion 50 adapted to receive a nut 52. The tapered portion 54 of the stud 46 predetermines the distance between brake head 16' and the truck brake lever 14'. In this embodiment, the brake head, together with the outer tubular member 38, is again free to move in a rotary direction relative to the inner member 36 which fits onto the connecting stud 46 with an interference fit.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In a brake assembly for a railway wheel comprising, in combination: a truck brake lever; a brake head; connecting means, including a non-sliding rubber-like bushing, extending through axially aligned openings in said brake lever and said brake head for resiliently suspending and connecting the brake head from said brake lever; and a brake shoe detachably but substantially rigidly carried on said brake head; the orientation of the brake shoe relative to the rotatable member to be braked being determined by the torque capability of the rubber-like bushing.

2. In a brake assembly according to claim 1, wherein said bushing member includes an inner and outer rigid tubular member; and an annulus of rubberlike material separating said tubular members and being maintained therebetween under substantial radial compression and axial elongation.

3. In a brake assembly according to claim 2, wherein the outer tubular member is secured with an interference fit in the opening of the brake head.

4. In a brake assembly according to claim 3, wherein said inner tubular member has a greater axial length than said outer member.

5. In a brake assembly according to claim 4, and a bolt extending coaxially through said bushing for biasing the inner tubular member against said truck brake lever to prevent relative movement therebetween.

6. In a brake assembly according to claim 5, wherein said bolt extends through said truck brake lever with an interference fit.

7. In a brake assembly according to claim 2, wherein the outer surface of the rubberlike annulus is cemented to the inner surface of the outer tubular member.

8. In a brake assembly according to claim 2, wherein the inner surface of the rubberlike annulus is cemented to the outer surface of the inner tubular member.

9. In a brake assembly according to claim 8, wherein the outer surface of the rubberlike annulus is cemented to the inner surface of the outer tubular member.

10. In a brake assembly for a railway wheel comprising, in combination: an elongated truck brake lever; a brake head member having side walls for receiving said truck brake lever therebetween, said brake lever and each of said side walls having axially aligned openings; connecting means, including a rubberlike bushing, in at least one of said openings for resiliently connecting the brake head to the brake lever; and said brake head member being adapted to receive a brake shoe and suspend the same resiliently in a substantially fixed orientation relative to the railway wheel.

11. In a brake assembly for a railway wheel according to claim 10, wherein a rubberlike bushing is carried in each of said side walls.

12. In a brake assembly for a railway wheel according to claim 11, wherein said bushings are axially spaced to receive the truck brake lever therebetween, each of said bushings including an inner tubular sleeve dimensioned for abutting against the brake lever.

13. In a brake assembly for a railway wheel according to claim 12, and wherein said connecting means includes a bolt extending axially through said bushings and the openings of said truck brake lever and effective for biasing said inner tubular sleeves, endwise, against said lever.

14. In a brake assembly for a railway wheel comprising, in combination: an elongated truck brake lever; a brake head member having side walls for receiving said truck brake lever therebetween, said brake lever member and each of said side walls having axially aligned openings; connecting means resiliently connecting and suspending said brake head from said brake lever, said means including a rubber-like bushing, said bushing including an inner and outer rigid tubular member, and an annulus of rubber-like material separating said tubular members and being maintained under substantial radial compression and axial elongation by the tubular member; said inner tubular member extending through each of said openings and engaging said truck brake lever with an interference fit.

15. In a brake assembly for a railway wheel according to claim 14, wherein the outer tubular member comprises two sections, one being disposed in each opening of the said wall and spaced relative to each other.

16. In a brake assembly according to claim 1, wherein said connecting means includes an inner, coaxially arranged support member, and said bushing is comprised of an annulus of rubberlike material separating the support member and the brake head and being maintained therebetween under substantial radial compression and axial elongation.

17. In a brake assembly according to claim 16, and a tubular outer member interposed between said annulus and said brake head.

18. In a brake assembly according to claim 16, wherein said support member is a tubular sleeve.

19. In a brake assembly according to claim 16, wherein said support member is a bolt-like structure.

20. In a brake assembly comprising, in combination: a truck brake lever having a first opening; a brake head member having an opening coaxially aligned with the first said opening; a rubberlike bushing disposed within the opening of the brake head member; and a connecting stud extending through said bushing and said first opening for resiliently securing said members to each other.

21. In a brake assembly according to claim 20, wherein said stud portion extending into said first opening is at least partly tapered toward said truck brake lever.

22. In a brake assembly according to claim 21, wherein the end of the stud opposite from the tapered portion is provided with a radially enlarged head effective for abutting said head member.

23. In a brake assembly according to claim 7, wherein the outer surface of the rubberlike annulus is vulcanized onto the inner surface of the outer tubular member.

24. In a brake assembly according to claim 8, wherein the inner surface of the rubberlike annulus is vulcanized onto the outer surface of the inner tubular member.

References Cited

UNITED STATES PATENTS

| | | | |
|---|---|---|---|
| 2,150,631 | 3/1939 | Piron | 188—216 X |
| 2,496,250 | 1/1950 | Light | 188—221 X |

DUANE A. REGER, *Primary Examiner.*